United States Patent [19]

Yanagihara

[11] 4,342,435
[45] Aug. 3, 1982

[54] TAKE-UP FORCE REDUCING MECHANISM OF A SEAT BELT RETRACTOR

[75] Inventor: Hideo Yanagihara, Fujisawa, Japan

[73] Assignee: NSK-Warner K.K., Tokyo, Japan

[21] Appl. No.: 169,379

[22] Filed: Jul. 16, 1980

[30] Foreign Application Priority Data

Aug. 21, 1979 [JP] Japan .................................. 54/105538

[51] Int. Cl.³ ........................ A62B 35/00; B65H 75/48
[52] U.S. Cl. .............................. 242/107; 242/107.4 R; 297/475; 280/807
[58] Field of Search .......... 242/107, 107.4 R–107.4 E, 242/107.6, 107.7; 280/802–808; 297/475–478; 180/268, 270

[56] References Cited

U.S. PATENT DOCUMENTS

| 4,026,494 | 5/1977 | Tanaka | 242/107 |
| 4,113,200 | 9/1978 | Tanaka | 242/107 |

FOREIGN PATENT DOCUMENTS

| 52-20525 | 2/1977 | Japan | 242/107 |
| 52-33220 | 3/1977 | Japan | 242/107.6 |
| 52-62820 | 5/1977 | Japan | 242/107 |
| 54-97923 | 8/1979 | Japan | 242/107 |

Primary Examiner—John M. Jillions
Attorney, Agent, or Firm—Shapiro and Shapiro

[57] ABSTRACT

In a seat belt retractor having two springs at least one of which acts for taking up webbing and wherein webbing take-up force can be reduced by controlling at least one of the two springs, a take-up force reducing mechanism comprises a rotatable member connected to one of the springs for controlling the output of the one spring so that when the rotatable member is in its movable condition, there is obtained an unreduced webbing take-up force and that when the rotatable member is unrestrained, the webbing take-up force is reduced, a restraining member capable of assuming a restraining position to restrain the rotatable member and a non-restraining position in which it cannot restrain the rotatable member, a friction cam member capable of following the rotational movement of the rotatable member due to friction therewith and also capable of assuming a first rotated position and a second rotated position, and electromagnetic means for moving the restraining member to said non-restraining position by an extraneous signal.

3 Claims, 13 Drawing Figures

TAKE-UP FORCE REDUCING MECHANISM OF A SEAT BELT RETRACTOR

BACKGROUND OF THE INVENTION

1. Field of the Invention

This invention relates to a take-up force reducing mechanism of a seat belt retractor which reduces the take-up force in seat belt wearing conditions.

2. Description of the Prior Art

Several seat belt retractors provided with this type of take-up force or tension reducing means have heretofore been proposed, but they have a disadvantage that the mechanism for changing over the condition in which the take-up force is not reduced and the condition in which the take-up force is reduced is complicated.

SUMMARY OF THE INVENTION

It is an object of the present invention to provide a seat belt retractor provided with a take-up force reducing mechanism which is simple in construction and reliable in operation.

In the present invention, electromagnetically acting means is adopted for the mechanism for changing over from the take-up force reducing condition to the take-up force non-reducing condition.

The invention will become fully apparent from the following detailed description of preferred embodiments thereof taken in conjunction with the accompanying drawings.

DESCRIPTION OF THE PREFERRED EMBODIMENTS

Figure 1:
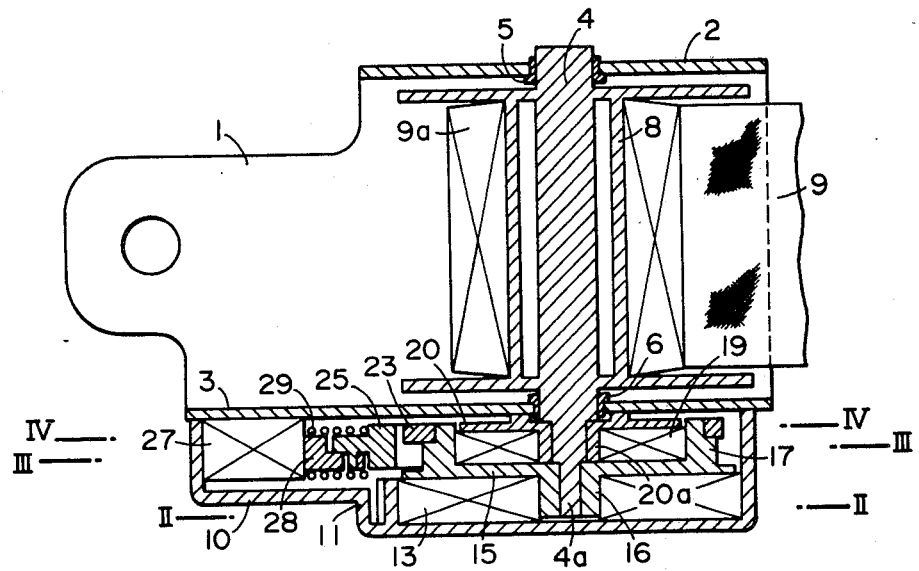
FIG. 1 is a central cross-sectional view of a first embodiment of the present invention.
Figure 2:
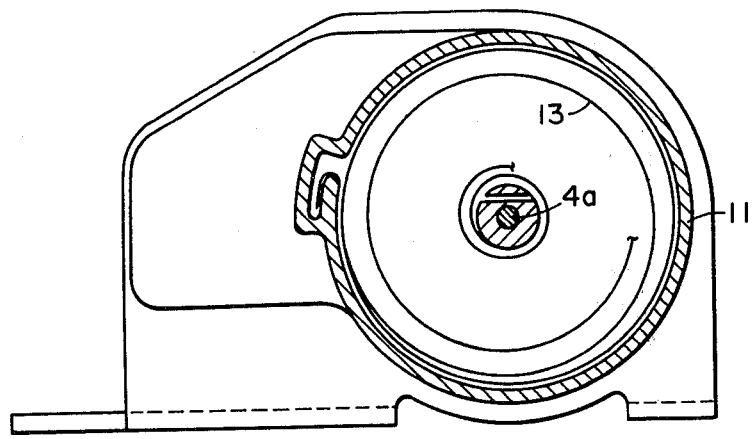
FIG. 2 is a cross-sectional view taken along line II—II of FIG. 1.

FIGS. 1 to 6 show a first embodiment of the present invention. In this embodiment, use is made of a first spiral spring of strong spring force acting in webbing take-up direction and a second spiral spring of relatively weak spring force acting in the same direction. During the webbing take-up, these two springs are caused to act in series and during the seat belt wearing, the spring force of the first spiral spring is suppressed and only the second spiral spring is caused to act.

In these FIGS., a seat belt retractor has a base 1 and two parallel side plates 2 and 3 integral therewith. A take-up shaft 4 is rotatably journalled to the side plates 2 and 3 through bearing bushings 5 and 6. A take-up reel 8 is formed integrally with the take-up shaft 4 inwardly of the side plates 2 and 3, and one end of webbing 9 is secured to and taken up on the take-up reel in a well-known manner to form a take-up layer 9a. A cover 10 is secured to the outer side of the side plate 3, and a take-up force reducing mechanism which will hereinafter be described is provided in the space defined by the cover 10 and the side plate 3.

The cover 10 has a cylindrical portion 11 concentric with the take-up shaft 4, and a first spiral spring 13 of strong spring force adapted primarily to act to take up the webbing in a manner to be described is disposed within the cylindrical portion. The first spiral spring 13 has its outer end secured to the inner diameter surface of the cylindrical portion 11 or to the neighborhood thereof and has its inner end secured to the small-diametered cylindrical portion 16 of a rotatable disc member 15. With this small-diametered cylindrical portion 16, the rotatable disc member 15 is fitted to the extension 4a of the take-up shaft 4 for free relative rotation. The rotatable disc member 15 has a large-diametered cylindrical portion 17 extending toward the side plate 3, and a second spiral spring 19 of weak spring force is disposed at the inner diameter side of the large-diametered cylindrical portion 17. The second spiral spring has its outer end secured to the inner diameter portion of the large-diametered cylindrical portion 17 of the rotatable disc member 15 and has its inner end secured either to the shaft portion 20a of a cap 20 secured to the take-up shaft 4 or to the take-up shaft 4 itself. With such a construction, the action force of the first spiral spring 13 is transmitted to the take-up shaft through the rotatable disc member 15 and the second spiral spring 19.

Figure 3:
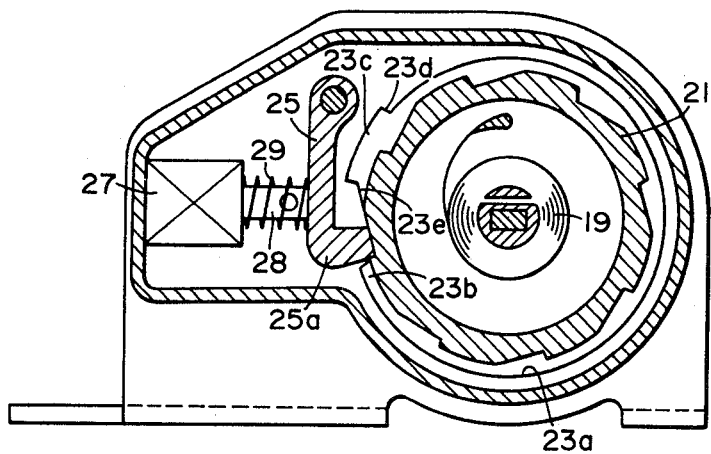
FIG. 3 is a cross-sectional view taken along line III—III of FIG. 1.
Figure 4:
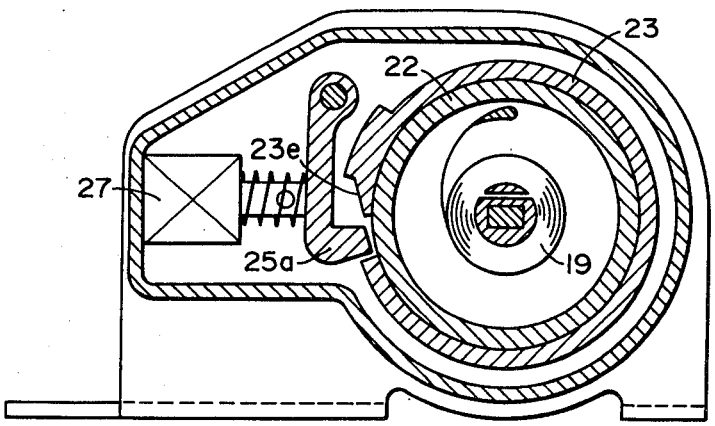
FIG. 4 is a cross-sectional view taken along line IV—IV of FIG. 1.

The outer peripheral portion of the large-diametered cylindrical portion 17 of the rotatable disc member 15 forms a ratchet gear 21 on that side thereof which is adjacent to the first spiral spring 13 (see FIG. 3), and a generally ring-shaped friction cam member 23 is press-fitted on the outer peripheral surface 22 on that side which is adjacent to the side plate 3 (see FIG. 4). A pawl member 25 is supported on the side plate 3 diametrically outwardly of the ratchet gear 21 and the friction cam member 23, and the pawl member 25 has a pawl 25a which is engageable with the ratchet gear 21 and the friction cam member 23 in a manner to be described. The side plate 3 further has a solenoid 27 attached thereto, and the right end of an iron core 28 controlled by the solenoid as viewed in FIG. 3 is pivotally connected to the back of the pawl member 25. A compression coil spring 29 is provided around the iron core 28 to bias the pawl member 25 toward the ratchet gear 21 and the friction cam member 23. Accordingly, the pawl 25a is normally engaged with the ratchet gear 21 and the friction clutch member 23, but when the solenoid is excited by an extraneous signal to be described, the pawl member 25 is clockwisely pivoted against the bias of the spring 29 and brought out of engagement with the members 21 and 23. When the pawl 25a is in engagement with the ratchet gear 21, a tooth of the ratchet gear meshes with the pawl 25a and thus, the ratchet gear 21, namely, the rotatable disc member 15 integral therewith, is prevented from rotating in the webbing take-up direction and accordingly, transmission of the action force of the first spiral spring 13 to the take-up shaft 4 is prevented. At this time, the take-up shaft 4 is subjected to only the weak action of the second spiral spring 19.

The friction cam member 23 is press-fitted on the outer peripheral surface 22 of the large-diametered cylindrical portion 17 of the rotatable disc member 15 and thus, it follows the rotational movement of the rotatable disc member 15 due to friction. The friction cam member 23 has a circumferential portion 23a generally greater in diameter than the tooth top of the ratchet gear 21, but is split between the ends 23b and 23c thereof so as to permit entry of at least the pawl 25a. Therefore, even if the take-up shaft 4 is rotated in the webbing take-up direction when the pawl 25a has entered into the split, the friction cam member 23 will be prevented from being rotated in the take-up direction because of its end 23b being engaged by the pawl 25a. Under such conditions, the ratchet gear 21 will also be prevented from rotating in the take-up direction by the pawl 25a. When the solenoid 27 is energized to attract the iron core 28, the pawl member 25 is thereby pivoted out of engagement with the ratchet gear 21 and the friction cam member 23 and therefore, the take-up shaft is suddenly rotated in the take-up direction by the first and second spiral springs. Thus, in a moment, the pawl 25a rides onto the circumferential portion 23a of the friction cam member and is held in non-engagement with the ratchet gear 21. A diametrically projected shoulder 23d is formed in the circumferential portion 23a of the friction cam member 23 and when the pawl 25a has ridden on the circumferential portion 23a, the shoulder 23d strikes against the pawl 25a. Accordingly, with the pawl member 25 remaining non-engaged with the ratchet gear 21, the take-up shaft is rotated in the take-up direction by the forces of the first and second spiral springs to take up the webbing.

When the take-up shaft 4 is rotated in the webbing pay-out direction from this position by the webbing being payed out, the pawl 25a is moved from the circumferential portion 23a of the friction cam member 23 to the split between the ends 23b and 23c, namely, to said engaged position. The ratchet gear 21 remains rotatable because it is in escape direction with respect to this direction of the rotation. The friction cam member 23 has the face of its end 23c engaged with the pawl 25a and is held in such engaged position. At this time, the friction cam member 23 is pushed open outwardly by the pawl 25a and thus, the friction between it and the outer peripheral surface 22 of the rotatable disc member is reduced. Even if the pawl 25a is engaged with the ratchet gear 21 during this rotation in the pay-out direction, there is no functional problem but a clicking sound occurs. Therefore, in the case of the present embodiment, the face of the end 23c of the friction cam member has an inclined cam surface 23e so that during the rotation in the webbing pay-out direction, the pawl 25a rides on the inclined cam surface 23e and is out of engagement with the ratchet gear 21. With such construction, when the webbing is manually or automatically payed out from the retractor during the seat belt wearing, the first and second spiral springs will be connected in series.

When the seat belt is worn, it fits to the wearer's body and so, the webbing is slightly rewound. Therefore, the friction cam member 23 follows it. The pawl 25a is brought into engagement with the ratchet gear 21 by the compression coil spring 29 to lock the ratchet gear 21 against rotation in the take-up direction. In this manner, the strong spring force of the first spiral spring is suppressed and only the weak spring force of the second spiral spring is permitted to act. If the second spiral spring is selected to a weak spring force required for the webbing to fit to the wearer's body, the wearer will very little feel the spring force.

When it is desired to take off the seat belt, a signal may be imparted to excite the solenoid, whereby the pawl member 25 may ride onto the outer periphery of the friction cam member 23 in the previously described manner and the first spiral spring may be connected to the take-up shaft through the second spiral spring and the webbing may be rewound.

Figure 10:
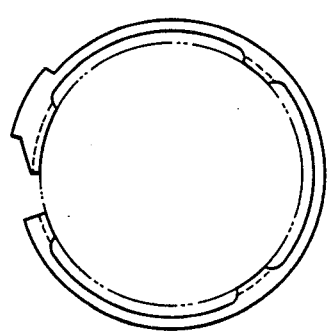
FIG. 10 is a view showing a friction ring member.
Figure 11:
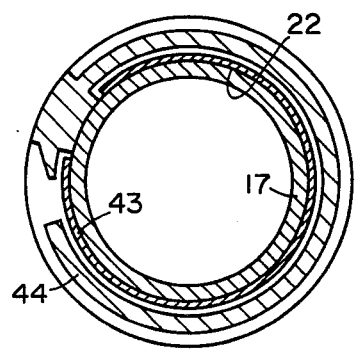
FIG. 11 shows a modification of the friction ring member.

The above embodiment has been shown with respect to an example in which the friction cam member 23 (FIG. 10) is press-fitted on the outer peripheral surface 22 of the large-diametered cylindrical portion 17 of the rotatable disc member 15 from the outside diameter side thereof, whereas an example in which there is a portion which contacts the inside diameter side and the friction cam member is press-fitted from the inside diameter side will also be possible or, as shown in FIG. 11, the friction cam member 23 may be formed by two members such as a friction ring 43 frictionally engaged with the outer peripheral surface 22 of the large-diametered cylindrical portion 17 and a cam ring 44.

Description will now be made of an example in which a signal from the seat belt buckle produced by operation of a release button is utilized as the control signal for the solenoid.

Figure 7:
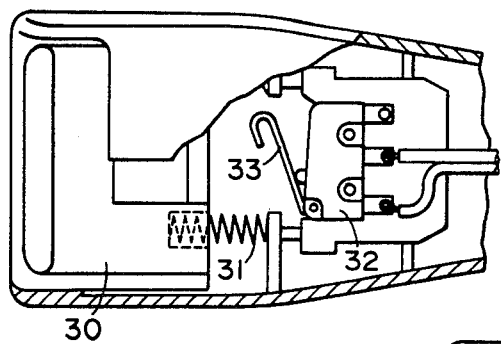
FIG. 7 is a partly cut-away view of a buckle provided with a control switch.
Figure 8:
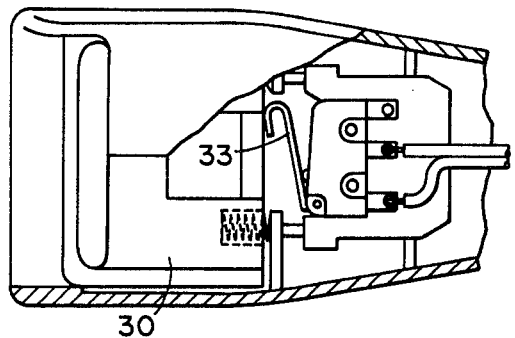
FIG. 8 shows the condition in which the push button of the buckle shown in FIG. 7 has been operated.

FIGS. 7 and 8 are cut-away cross-sectional views of an example of the seat belt buckle. FIG. 7 shows a position in which the switch is open, and FIG. 8 shows a position in which the switch is closed. In FIGS. 7 and 8, the buckle has a slidable release button 30. The release button is biased to the position of FIG. 7 by a coil spring 31. A normally open microswitch 32 is provided within the buckle and its movable contact piece 33 is biased in the movement path of the release button 30 by an unshown spring in the microswitch.

When the release button 30 is pushed as shown in FIG. 8, the contact piece 33 is also pushed to close the microswitch 32. If this microswitch is connected in series with the solenoid 27 of the aforementioned retractor, the solenoid will be energized when the release button has been pushed.

The microswitch has been described as being operatively associated with the release button, but it is often the case that the switch contained within the seat belt buckle is usually opened upon insertion of a tongue and is closed when the tongue is released. If such a tongue-associated switch was intactly connected in series with the solenoid of the retractor, there could be a waste of power.

Figure 9:
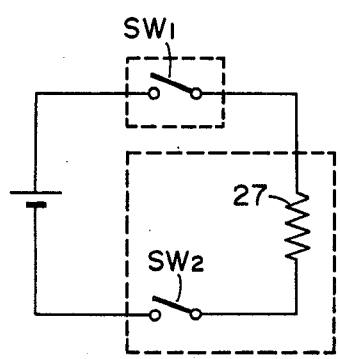
FIG. 9 is a diagram of a retractor control circuit.

For this reason, as shown in FIG. 9, in the serial circuit of the switch $SW_1$ provided within the buckle and the solenoid 27 within the retractor, a second switch $SW_2$ may preferably be connected so that the second switch $SW_2$ is opened when it is not necessary to excite the solenoid 27.

Figure 5:
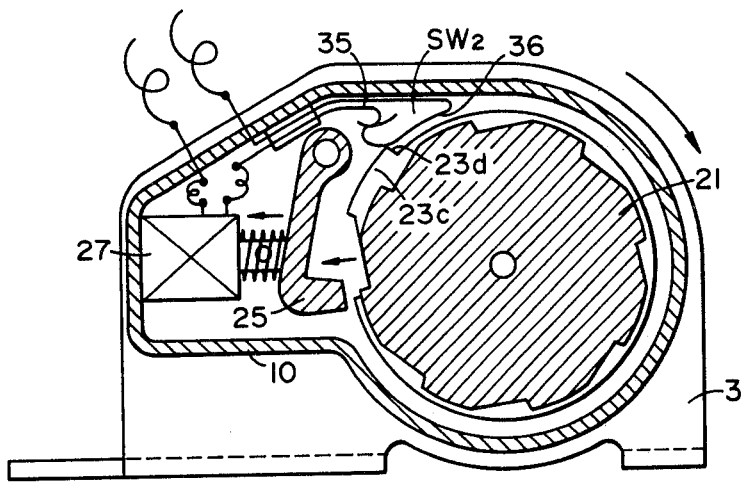
FIGS. 5 and 6 illustrate the operation of the first embodiment provided with a power saving switch.
Figure 6:
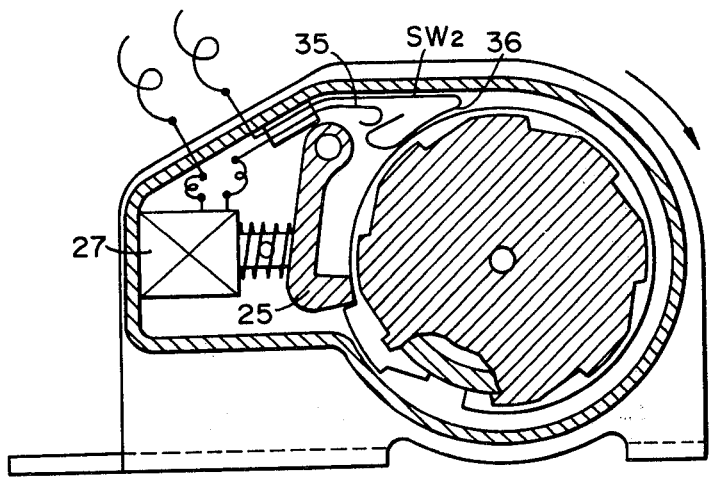

FIGS. 5 and 6 show an example in which such switch $SW_2$ is provided within the retractor. That is, the switch $SW_2$ has its contact pieces 35 and 36 secured within the cover 10 of the side plate 3. The contact piece 35 is a fixed contact piece while the contact piece 36 is a movable contact piece and its movable portion is projected into the movement path of the end portion 23c of the aforementioned friction cam member 23 which is projected diametrically thereof, and the contact piece 36 may contact said end portion 23c and be thereby pushed so that the contact pieces 35 and 36 can be brought into contact with each other to close the switch $SW_2$. During the other time, the contact pieces are separated from each other to open the switch $SW_2$.

With such construction, when the seat belt is worn and the pawl member 25 is in engagement with the ratchet gear 21 as shown in FIG. 3, the end portion 23c of the friction cam member 23 contacts the contact piece 36 to close the switch $SW_2$. When the tongue-associated switch $SW_1$ within the buckle is closed by releasing the tongue, the circuit of FIG. 9 is closed so that the solenoid is excited to bring the pawl member 25 out of engagement with the ratchet gear 21. Since, at this time, the friction member 23 is rotated in the webbing take-up direction as previously described, the end portion 23c is brought out of engagement with the contact piece 36 to open the second switch $SW_2$. The pawl member 25 rides onto the circumferential portion 23a of the friction cam member to restrain the shoulder 23d and so, the switch $SW_2$ is maintained in its open position until the webbing is next payed out. Thus, the current flowing through the circuit shown in FIG. 9 is only momentary and there is substantially no waste of power.

Figure 12:
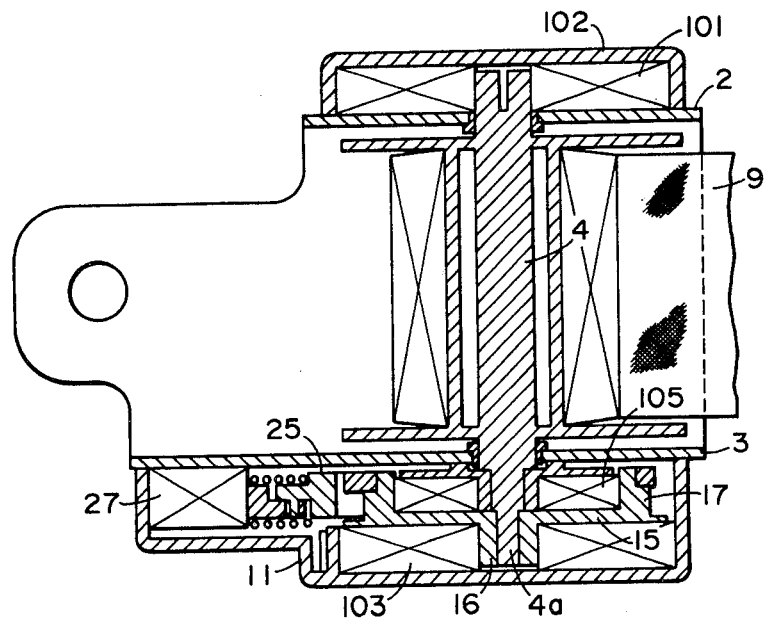
FIG. 12 is a central cross-sectional view of a second embodiment of the present invention.
Figure 13:
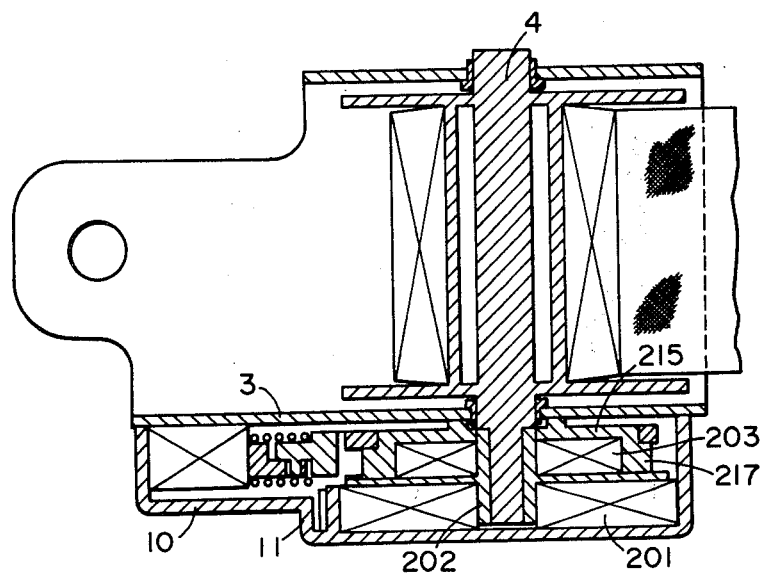
FIG. 13 is a central cross-sectional view of a third embodiment of the present invention.

Reference is now had to FIGS. 12 and 13 to describe a second and a third embodiment of the present invention. In these figures, parts similar to those in the first embodiment are given similar reference characters and parts different from those in the first embodiment will be mainly described.

In the second embodiment shown in FIG. 12, two spiral springs acting in the webbing take-up direction are parallel-connected to the take-up shaft and during the take-up, the webbing is taken up by the action of these two spiral springs and during the seat belt wearing, only one of the spiral springs is caused to act on the take-up shaft and thereby reduce the take-up force.

In FIG. 12, outside of the base side plate 2, the inner end of a first spiral spring 101 acting in the webbing take-up direction is retained on the take-up shaft 4 and the outer end thereof is fixed to a spring cover 102 which in turn is secured to the side plate 2. The outer end of a second spiral spring 103 acting in the webbing take-up direction is fixed to the cylindrical portion 11 of the spring cover 10 which is adjacent to the base side plate 3 and the inner end thereof is fixed to the small-diametered cylindrical portion 16 of the rotatable disc member 15 which is rotatably fitted on the extension 4a of the take-up shaft 4. On the inner diameter side of the large-diametered cylindrical portion 17 of the rotatable disc member 15, belt 105 forms a belt layer turned about the take-up shaft 4. The outer end of the belt 105 is secured to a portion of the inner peripheral surface of the cylindrical portion 17 and the inner end thereof is fixed to the take-up shaft 4.

With such a construction, when the webbing 9 is payed out, the first spiral spring 101 is directly charged by the take-up shaft 4. As regards the second spiral spring 103, the belt 105 is first tightly wound over a predetermined amount by the take-up shaft 4, and then the second spiral spring is charged through the belt 105 and the rotatable disc member 15.

When the seat belt has been worn, a force in the take-up direction is caused to act on the rotatable disc member 15 by the second spiral spring 103, but the rotatable disc member 15 is prevented from rotating in the take-up direction because of the pawl 25a of the pawl member 25 meshing with the ratchet gear 21 of the large-diametered cylindrical portion 17 and accordingly, the action of the second spiral spring 103 upon the take-up shaft 4 is prevented. Therefore, a slight slack of the webbing during the seat belt wearing is taken up on the take-up shaft 4 by the first spiral spring 102. At this time, the turn layer of the belt 105 comes loose. When the webbing is again payed out, the belt 105 is tightly wound. Within the range of this predetermined amount of tight winding of the belt 105, only the first spiral spring 101 acts on the take-up shaft 4 and thus, the take-up force is reduced.

If the solenoid 27 is excited when the seat belt is taken off, the engagement of the pawl member 25 with the ratchet gear 21 will be released and the webbing will be taken up by the first and second spiral springs 101 and 103.

According to the present embodiment, the take-up force reduction range is determined by the length of the belt and so, such reduction range can be increased.

In the third embodiment shown in FIG. 13, use is made of a webbing take-up first spiral spring and a second spiral spring acting in the direction opposite to that of the first spiral spring and during the seat belt wearing, the second spiral spring is caused to act on the take-up shaft to reduce the take-up force.

In FIG. 13, a webbing take-up first spiral spring 201 is disposed within the cylindrical portion 11 of the cover 10 secured to the retractor base side plate 3, and the outer end thereof is fixed to the inner peripheral portion of the cylindrical portion 11 while the inner end thereof is fixed to a holder 202 secured to the take-up shaft 4. Within the cylindrical portion 217 of a rotatable disc member 215 rotatable relative to the take-up shaft 4, a second spiral spring 203 of weaker spring force than the first spiral spring which acts in the direction opposite to the take-up direction has its outer end fixed to the inner peripheral portion of the cylindrical portion 217 and its inner end fixed to the spring holder 202. The construction of the cylindrical portion 217 is the same as the consturction of the large-diametered cylindrical portion 17 of the rotatable disc member 15 in the first embodiment.

During the webbing pay-out, the first spiral spring 201 is charged while the second spiral spring 203 does not act on the take-up shaft 4 with the rotatable disc member 217 being idly rotated. When the seat belt is worn, rotation of the rotatable disc member 217 is prevented and therefore, the second spiral spring 203 acts on the take-up shaft 4 to reduce its take-up force.

According to the present invention, the take-up force reducing mechanism is electrically controlled and this leads to simplicity of the construction.

Also, according to the present invention, the electromagnetic means may be excited only during the change-over from the take-up force reducing condition to the non-reducing condition and the power consumed may be small.

I claim:

1. In a take-up force reducing mechanism of a seat belt retractor having two springs at least one of which acts for taking up webbing and wherein webbing take-up force can be reduced by controlling at least one of said two springs, the improvement comprising:
a rotatable member connected to one of said springs for controlling the output of that spring so that when said rotatable member is in its movable condition, there is obtained an unreduced webbing take-up force and that when said rotatable member is restrained, the webbing take-up force is reduced;

a restraining member capable of assuming a restraining position in which it is engaged with said rotatable member to restrain said rotatable member and a non-restraining position in which it cannot restrain said rotatable member, said restraining member being biased toward said restraining position;

a friction cam member capable of following the rotational movement of said rotatable member due to friction therewith and also capable of assuming a first rotated position when said rotatable member is rotated in the webbing pay-out direction and assuming a second rotated position when said rotatable member is rotated in the webbing take-up direction, said friction cam member permitting movement of said restraining member to said restraining position and being conversely prevented from moving to said second rotated position by said restraining member when said friction cam member assumes said first rotated position, and said friction cam member holding said restraining member in said non-restraining position when said friction cam member assumes said second rotated position with the restraint by said restraining member being released;

electromagnetic means for moving said restraining member to said non-restraining position; and switch means for controlling said electromagnetic means, said switch means including a switch operated by said friction cam member, said friction cam member having switch operating means for closing said switch to energize the electromagnetic means when said friction cam member is in said first rotated position and opening said switch to de-energize said electromagnetic means when said friction cam member is in said second rotated position.

2. A mechanism according to claim 1, wherein said switch is connected in series with said electromagnetic means and wherein said friction cam member has a switch controlling cam portion defining said operating means.

3. A mechanism according to claim 2, wherein said switch means includes another switch associated with a seat belt buckle and tongue and being connected in series with said electromagnetic means, said another switch being closed when the seat belt buckle and tongue are engaged with each other and opened when the seat belt buckle and tongue are disengaged, and said electromagnetic means being energized only when both switches are closed.

* * * * *